United States Patent [19]

Hai-Yung

[11] Patent Number: 5,186,652
[45] Date of Patent: Feb. 16, 1993

[54] SELF-POWER-CONTAINED MULTIPURPOSE PLUG SOCKET

[76] Inventor: Ku Hai-Yung, No. 11, Lane 221, Sec. 3, Pei-Hsin Road, Hsintein, Taipei, Taiwan

[21] Appl. No.: 780,047

[22] Filed: Oct. 21, 1991

[51] Int. Cl.$^5$ .......................................... H01R 13/00
[52] U.S. Cl. .................................................. 439/500
[58] Field of Search .................. 439/500, 620–622, 439/698

[56] References Cited

U.S. PATENT DOCUMENTS

| | | | |
|---|---|---|---|
| 2,352,576 | 6/1944 | Triplett | 439/500 |
| 3,392,365 | 7/1968 | Locke et al. | 439/500 |
| 4,221,454 | 9/1980 | Wong | 439/500 |

Primary Examiner—Joseph H. McGlynn
Attorney, Agent, or Firm—Lovercheck and Lovercheck

[57] ABSTRACT

This invention is a plug that could be electrically powered by either a self-contained battery or an external DC electrical source. It can screw connect to many types of formations, or can be connected to an assembly board to use as a chess game or as tutorial facilities.

8 Claims, 3 Drawing Sheets

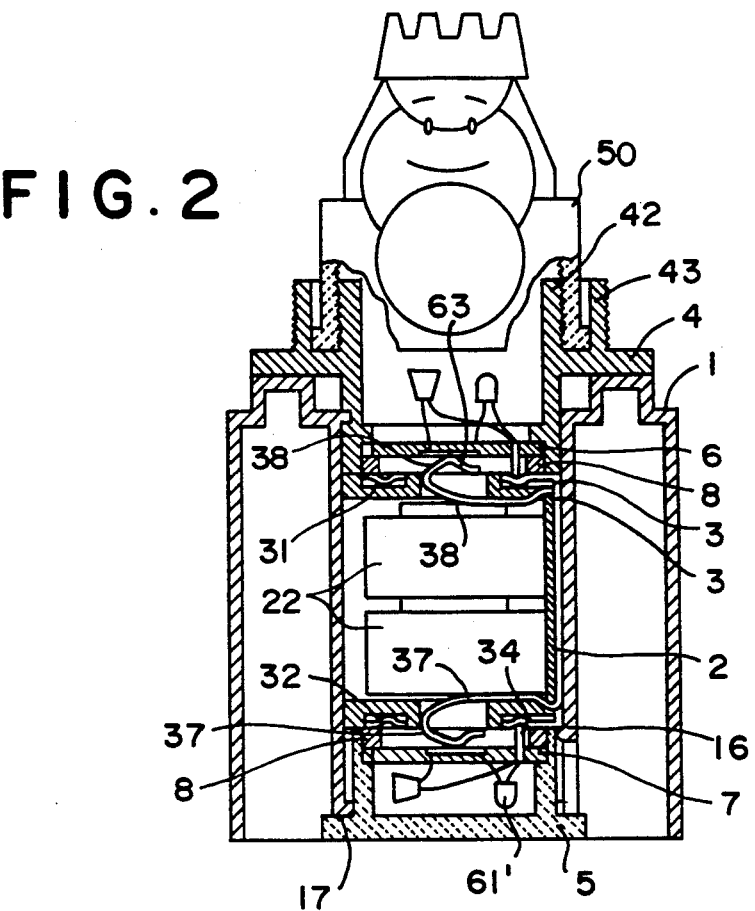
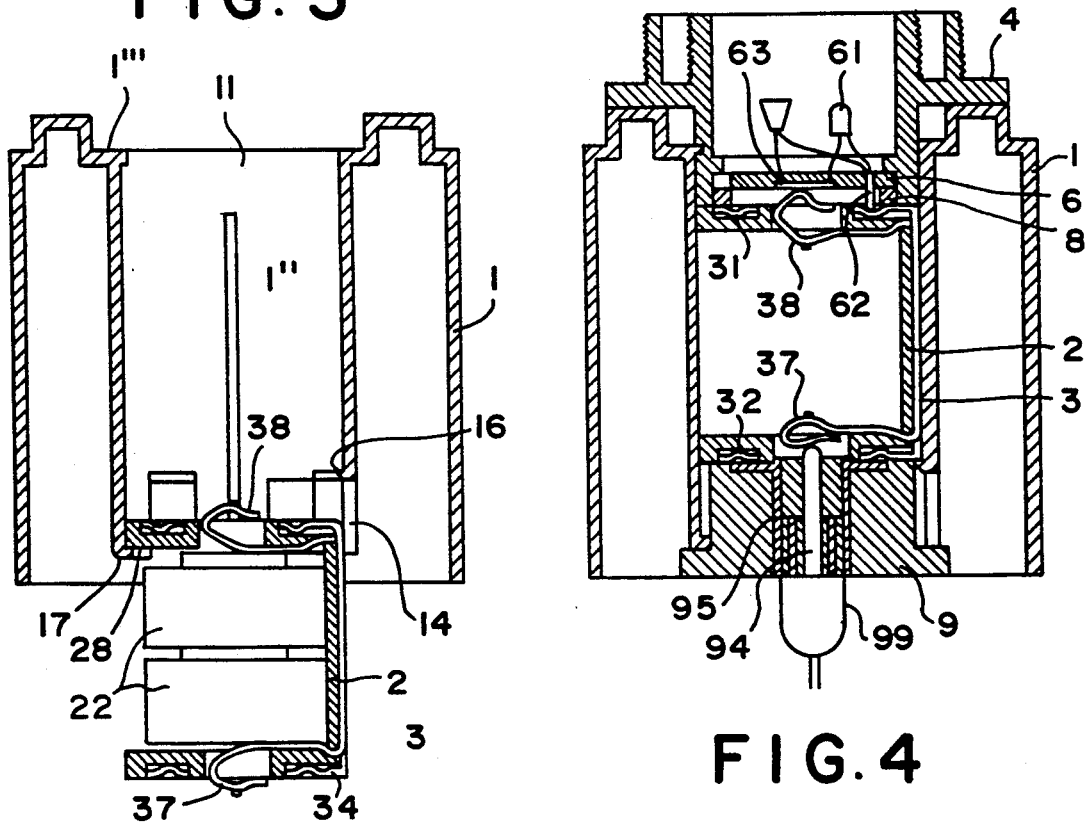

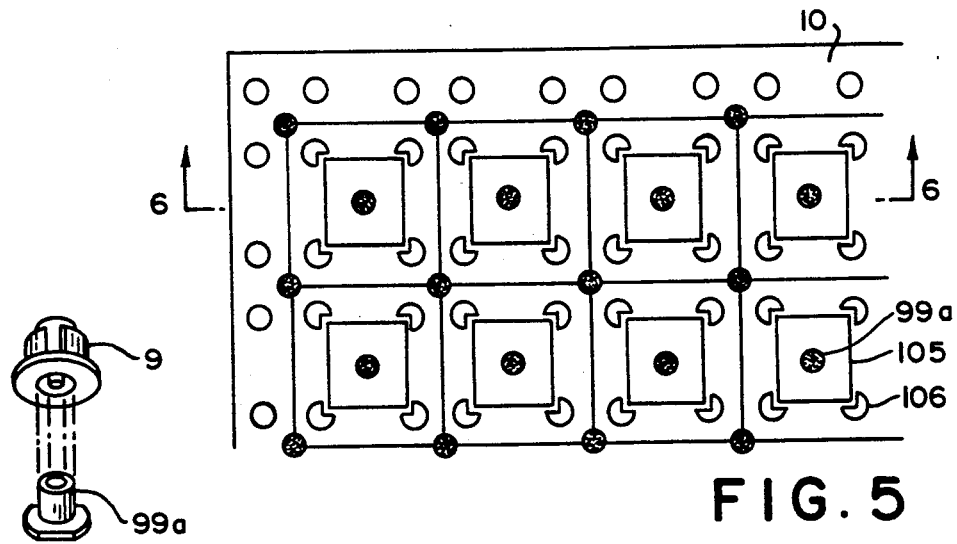
FIG. 5
FIG. 6A
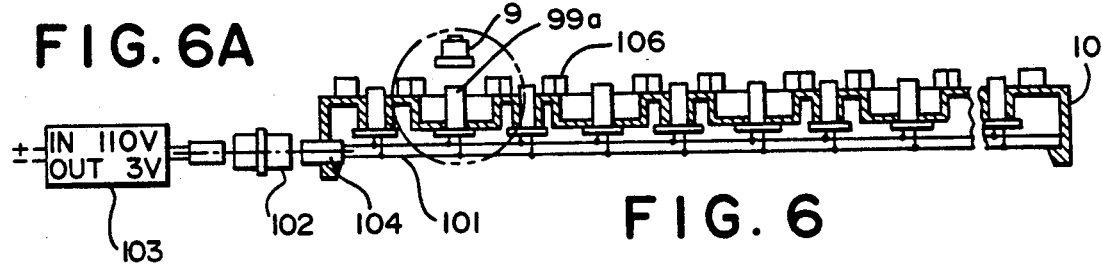
FIG. 6
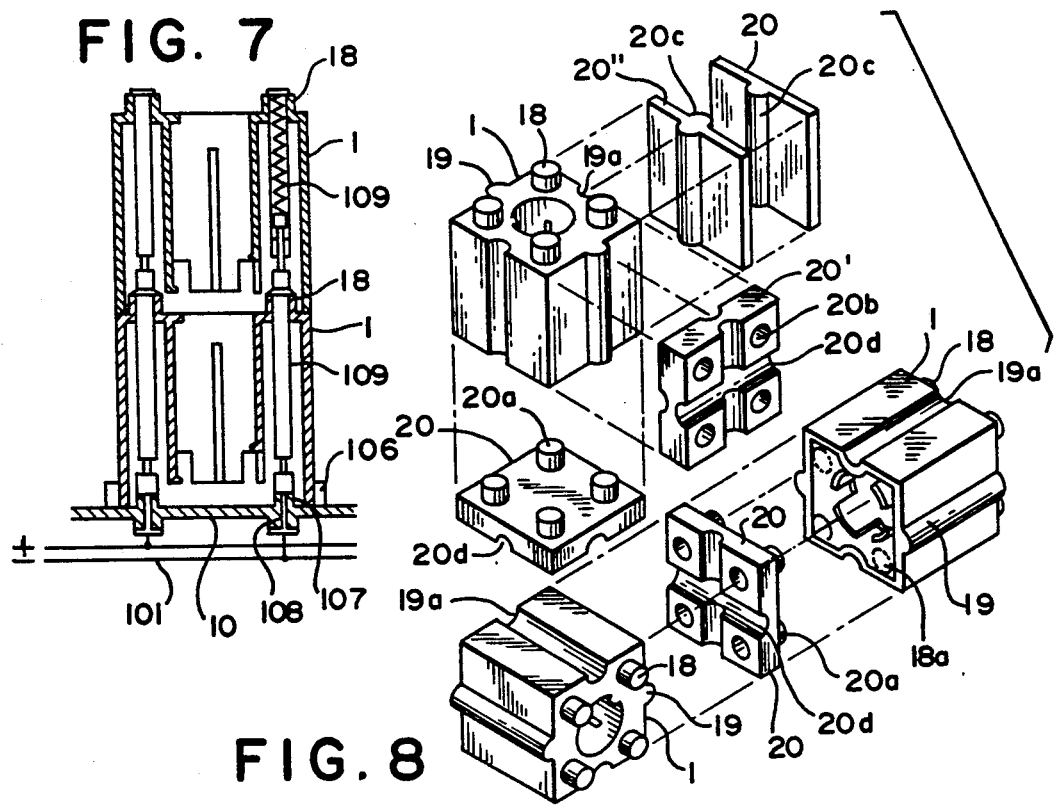
FIG. 7
FIG. 8

SELF-POWER-CONTAINED MULTIPURPOSE PLUG SOCKET

BACKGROUND OF THE INVENTION

This invention relates to a self-powered multi-purpose plug and socket, and more particularly to a battery supported in a main body unit which supplies electric power to light and audio means for a toy, or other formation, decorations and the like and an auxiliary electrical power source.

Many design formations such formation as toys, experimental tutorial equipment and decorations require an electrical power source.

BRIEF SUMMARY OF THE INVENTION

An object of this invention is to provide a new multipurpose power supply, light and/or electrical power supply unit that has a self-contained battery and is adapted to be connected to an external electrical power source. The invention could be assembled and arranged to support any suitable design formation. The main body unit of the invention contains a cylindrical bore through the center to hold a battery container. On the top of the main body unit is a screw threaded bore for connecting to a formation. Household appliances could be screwed on to the formation base. The main body units could be connected together by pins to construct a formation of an electric power supply board.

BRIEF DESCRIPTION OF THE DRAWING

FIG. 2 is a vertical cross sectional view of the invention.

FIG. 3 is a partial vertical cross sectional view similar to FIG. 2 of the body with a battery holder in the battery replacement position.

FIG. 4 is a partial cross sectional view similar to FIG. 2 of the body with the battery bed in place without a battery and the external power supply in place.

FIG. 5 is a diagram of the assembly board.

FIG. 6 is a cross sectional view taken on lines A—A of FIG. 5.

FIG. 6A is an enlarged view showing how the base and DC lug attach to each other.

FIG. 7 is a cross sectional view of another embodiment of an assembly of main body parts with elastic electrical conductive rods inserted.

FIG. 8 is an exploded view of the bridge connection with different types of bridge bodies.

DETAILED DESCRIPTION OF THE PREFERRED EMBODIMENT

Figure 1:
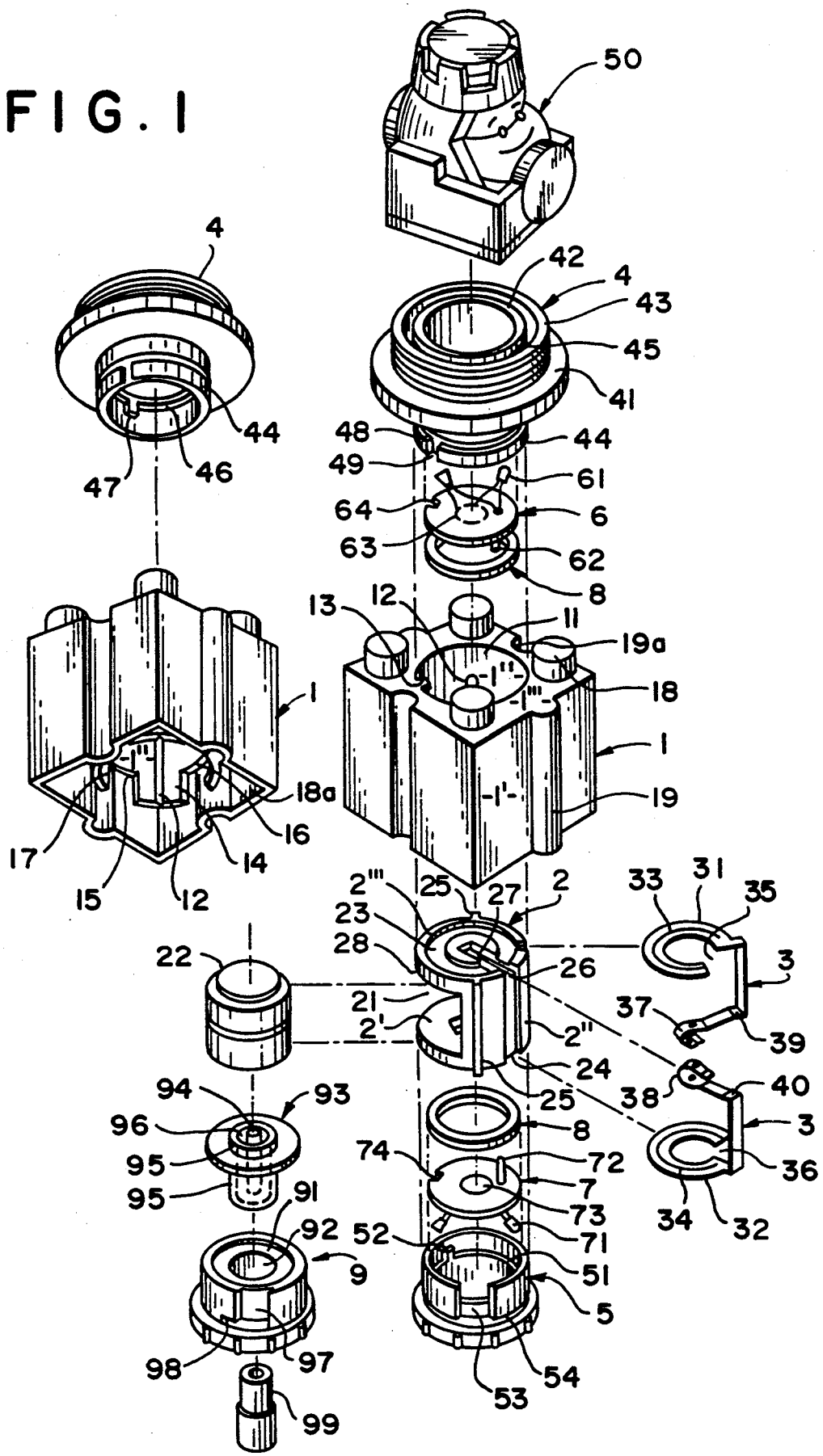
FIG. 1 is an exploded view of the device.

This invention includes main body unit 1, battery holder 2, electrical conductive copper strips 3, formation base 4, bottom 5, inter connecting IC units 6,7 packing ring 8, base for external electric power source connection 9 and assembly board 10. Main body unit 1 has generally cubical outer wall 1' and a generally cylindrical inner wall 1" integrally attached together by top wall 1'''. Generally cylindrical inner wall 1" defines cylindrical bore 11. Two circumferentially spaced longitudinally extending guide grooves 12 are formed in generally cylindrical inner wall 1". Generally cylindrical inner wall 1" has square fin 13 extending inwardly into bore 11. The lower end of generally cylindrical inner wall 1" has spaced extensions 14 separated by notches 15. Radially inwardly extending upper flanges 16 are fixed to generally cylindrical inner wall 1" at the base of notches 15 and lower radially extending flanges 17 are fixed to the lower ends of a first flange 14.

Battery holder 2 is generally in the form of a hollow cylinder with bottom 2', generally cylindrical partial side wall 2" and top 2'''. Bottom 2', generally cylindrical partial side wall 2" and top 2'''. Bottom 2', generally cylindrical partial side wall 2" and top 2''' of the cylinder defines recess 21 which receives battery 22. Circular groove 23 is formed in the top which receives ring 33 of electrical conductive copper strips 3. A similar groove is formed in the bottom of battery holder 2 for ring 34 and vertical groove 24 is formed in generally cylindrical partial side wall 2" of battery holder 2. The one side of battery holder 2 is open to receive battery 22. Battery 22 may be any of the well known dry cell type battery.

The outside surface of battery holder 2 has two ribs 25. Ribs 25 correspond to and are received in two circumferentially spaced longitudinally extending guide grooves 12 in the inside wall of cylindrical bore 11 of main body unit 1. Ribs 25 and circumferentially spaced longitudinally extending guide grooves 12 keeps battery holder 2 from rotating in cylindrical bore 11.

Electrical conductive copper strips 3 have annular collars 31,32 with circular grooves 23. Annular collars 31,32 are notched at notch section 35. One end of electrical conductive copper strips 3 is bent at right angles. The other end of electrical conductive copper strips 3 have hooks 37,38. Electrical conductive copper strips 3 are fitted into circular groove 23 and vertical groove 24 and over angled top flanges 26 of battery holder 2. When strips 39,40 are in place on battery holder 2, hooks 37,38 connect the positive and negative poles of battery 22 through center opening 27.

To assemble battery holder 2 in main body 1, first, battery holder 2 is placed in cylindrical bore 11 to the position shown in FIG. 3. Fit rib 25 of battery holder 2 into two circumferfentially spaced longitudinally extending guide grooves 12 of main body unit 1 and slide battery holder 2 into cylindrical bore 11 until radially inwardly extending upper flanges 16 on generally cylindrical wall 1" of battery holder 2 fits under battery holder 2 to hold battery holder 2 in place.

To change battery 22, the operator will depress lower radially extending flange 16 from under bottom 2' and slide battery holder 2 downward until top edge 28 of battery holder 2 engages lower radially extending flanges 17 as shown in FIG. 3 with battery 22 below main body unit 1 as shown in FIG. 3. Battery 22 can then be removed laterally from battery holder 2.

The top surface of main body unit 1 has four circular pins 18 fixed to it. The corresponding bottom side of main body units 1 has four holes 18a in it to receive four circular pins 18 when main body unit 1 are stacked as shown in FIG. 7. The surfaces of main body unit 1 has two pairs of longitudinal semi-circular ribs 19.

Main body unit 1 can be connected by means of bridge bodies 20,20'. Bridge bodies 20,20' have pins 20a and holes 20b which are on the opposite side. Bridge bodies 20,20' and rib rails 20c are semi-circular in cross section and grooves 20d are disposed at right angles to one another and are provided on each side of bridge bodies 20.

Main body unit 1 could have various shapes such as rectangular, parallelepiped, multi-angled body, or any kinds of possible assembly formation to improve its function.

Formation base 4 has outwardly directed circular flange 41 and externally threaded concentric upper tubular members 42,43 which may be attached to compatible threaded openings in formations 50. Formations 50 are shown as a toy design, but could be any suitable article design. Downwardly extending lower tubular members 44 has external groove 48 and notch 49 communicating with external groove 48. Downwardly extending lower tubular member 44 is received in the top of cylindrical bore 11 in main body unit 1. Square fin 13 slides through notch 49 into external groove 48 so that formation base 4 can be rotated on main body unit 1.

Downwardly extending lower tubular member 44 of formation base 4 receives IC unit 6 and packing ring 8. IC unit 6 is in the form of a circular disk with notch 64, lamp unit 61 and audio unit 61' are all supported on interconnecting IC units. Electrical conductive pin 62 and center circuit connector 63 are supported on interconnecting IC unit 6. Electrical conductive pin 62 is electrically connected to one terminal of lamp unit 61 and to one terminal of audio unit 61'. Electrical conductive pin 62 is fixed to packing ring 8 and makes contact with annular collar 31 of electrical conductive copper strip 3. Center circuit connector 63 makes contact with hook 38. When battery 22 is in battery holder 2, electricity flows from top and bottom terminals of battery 22 through center circuit conductor 63 through lamp unit 61 and audio unit 61' to electrical conductive pin 62, annular collars 31,32 and hooks 37,38 when the circuit is connected, lamp unit 61 and audio unit 61' are activated. Notch 64 receives fin 47 inside downwardly extending lower tubular member 44 of formation base 4. Therefore, IC unit 6 turns with formation base 4. When formation base 4 is turned, electrical conductive pin 62 slides along rings 33 in annular collar 31 to open notch section 35 of electrical conductive copper strip 3. When electrical conductive pin 62 reaches notch section 35 the circuit is opened to lamp unit 61 and audio unit 61' and are turned off.

When battery 22 is in place in battery holder 2 as shown in FIG. 2, battery 22 is in contact with hook 38 which also engages center circuit connector 63. Lamp unit 61 is connected between electrical conductive pin 62 and center circuit connector 63. Electrical conductive pin 62 rests in ring 33 which is a part of electrical conductive copper strips 3. Hook 37 engages the lower end of battery 22 completing a circuit through battery 22, hook 38, center circuit connector 63, lamp unit 61, electrical conductive pin 62 electrical conductive copper strip 3 and hook 37. The circuit can be opened by rotating outwardly directed circular flange 41 until electrical conductive pin 62 reaches notch section 35 in rings 33,34, thus, interrupting the circuit. Lamp unit 61 receives power from electrical conductive pin 62 which engages rings 33,34 and hooks 37,38.

Bottom 5 is about the same size as downwardly extending lower tubular member 44 of formation base 4, has a large grooves 53 that fits with radially inwardly extending upper flanges 16 at the bottom end of cylindrical bore 11 of main body unit 1. Bottom 5 fits into the bottom side of cylindrical bore 11 of main body unit 1 by sliding lower radially extending flange 17 of main body unit 1 into annular groove 54 of bottom 5, bottom 5 can also be turned beneath cylindrical bore 11. Bottom 5 could receive interconnecting IC unit 7 in inner housing space 51 and function with formation base 4.

When using an external DC electric source as shown in FIG. 4, base 9 fits into lower radially extending flanges 17. Groove 97 receives radially inwardly extending upper flange 16 and groove 98 receives lower radially extending flange 17. DC socket 93 rests on top of recessed surface 91 and tube 95 fits tight in central containing hole 92 of base 9. Electrical conductive rod 94 and tube 95 are separated by insulation 96. Electrical conductive rod 94 and tube 95 are used to connect electricity to electrical conductive copper strips 3 and external DC lug 99 to feed in 3-V DC transformer 103, as shown in FIG. 4.

Assembly board 10 has circuit 101 underneath its lower side, as shown in FIGS. 5 and 6. 3-V DC transformer 103 is connected to power input socket 104 of assembly board 10 through connector 102. DC power is available to formations 50 inserted on DC lugs 99a and connected to base 9.

FIG. 5 illustrates the assembly of main body unit 1 on an assembly board 10 by marking chess board line 105 and molding extrusion pins 106 to fit into holes 18A of main body unit 1. Main body unit 1 could also be stacked on each other on assembly board 10 as shown in FIG. 7. Main body units 1 are stacked together by connection of four circular pins 18 with other main body units 1 inserted in holes 18A. The bottom main body unit 1 is supported on extrusion pins 106 of assembly board 10. The current is conducted through conductive spring rod 109 which is inserted through insertion channel 118 and finally makes contact with conductive spring rods 109 merged in insertions 107 on assembly board 10.

Assembly board 10 is suitable for wide application. For instance, assembly board 10 can be used to test and inspect the proper function of electric toys and products on a production line, avoiding the complicated procedures of installing and removal of battery 22.

I claim:

1. A plug for connecting electrical power to an apparatus means and a formation base comprising:
   a main body unit;
   a battery holder;
   said main body unit having a generally cylindrical bore;
   said battery holder being slidably received in said generally cylindrical bore;
   said apparatus means on said main body unit;
   said battery holder being adapted to receive a battery;
   a first electric circuit on said battery holder connected to said apparatus means;
   said formation base supported on said apparatus means; and,
   switch means on said battery holder for connecting said battery to said first electric circuit whereby said apparatus means is energized.

2. The plug recited in claim 1 wherein said main body unit has a generally cylindrical inner wall generally concentric to said generally cylindrical bore and terminating in a lower end;
   said lower end having a first flange;
   an inwardly extending upper flange on said inner wall and an inwardly extending lower flange on a second flange;
   said battery holder being generally in the form of a hollow cylinder having a top wall, a bottom wall and a side wall extending between said top wall and said bottom wall;
   said side wall being open at one side;

said battery holder being adapted to be disposed in said cylindrical bore with said bottom wall resting in said upper flange and said battery in position for use; and, said battery holder being adapted to have said bottom wall resting on said second flange whereby said battery can be removed from said open side of said battery head.

3. The plug recited in claim 1 wherein;

said first electric circuit comprises a first conductor having a first hook and a first ring;

said first ring having a notch therein and connected to a first terminal on said battery;

a contact member having a first light connected thereto engaging said first hook;

said first hook engaging a second terminal on said battery;

a pin connected to said second terminal on said first light and adapted to engage said first ring;

said pin having a rotating means attached thereto whereby said pin can be swung around said first ring to enter said notch in said first ring whereby said first light is turned off.

4. The plug recited in claim 3 wherein said battery has a second electric circuit thereon;

said second electric circuit comprising an auxiliary power supply for use when said battery is removed from said battery holder;

said second electric circuit comprising a second ring connected to a second hook and adapted to engage said first terminal of said auxiliary power supply whereby said first terminal and said second terminal are connected to said first light; and, a second pin adapted to engage said second ring and adapted to connect said second terminal to said second hook.

5. The plug recited in claim 4 wherein a second light is supported on said battery holder;

said second light having said first terminal connected to said second hook; and, said second terminal connected to said second pin.

6. The plug recited in claim 1 wherein said bore in said main body has a fin in said cylindrical bore attached to said main body;

an axially extending guide groove formed in said inner wall;

said battery holder having an axially extending rib thereon; and, said rib adapted to be received in said groove whereby said battery holder is prevented from rotating.

7. The plug recited in claim 3 wherein said battery holder has a partial cylindrical side wall, a top wall and a bottom wall;

said side wall having a vertical groove formed therein;

said top wall having a circular groove formed therein;

said electrical circuit comprising a first conductor received in said vertical groove; and, said first ring adapted to be received in said circular groove in said top wall.

8. The plug recited in claim 7 wherein a second electrical circuit is received in said vertical groove in said side wall;

said second circular conductor is received in said groove in said bottom wall.

* * * * *